United States Patent [19]

Okano

[11] Patent Number: 4,515,872
[45] Date of Patent: May 7, 1985

[54] BATTERY PACK
[75] Inventor: Shizuo Okano, Hyogo, Japan
[73] Assignee: Sanyo Electric Co., Ltd., Japan
[21] Appl. No.: 526,854
[22] Filed: Aug. 26, 1983
[30] Foreign Application Priority Data
  Sep. 9, 1982 [JP] Japan .................. 57-137507[U]
[51] Int. Cl.³ .............................................. H01M 2/06
[52] U.S. Cl. ...................................... 429/65; 429/99;
  429/123; 429/178
[58] Field of Search ...................... 429/96–100,
  429/156–159, 178, 65, 123, 163

[56] References Cited
U.S. PATENT DOCUMENTS 3,000,999  9/1961  Schlau .................................. 429/99
  3,657,021  4/1972  Mathews ............................... 429/97
  4,123,598 10/1978  Hammel ................................ 429/159
  4,161,568  7/1979  Lund ..................................... 429/99

Primary Examiner—Anthony Skapars
Attorney, Agent, or Firm—Darby & Darby

[57] ABSTRACT

A battery pack (1) used as a power source for portable units. A plurality of secondary cells (7) are housed in a case (3). One end of the case (3) is formed with a recess (4), in which a plurality of contact terminal plates (10,11,12; 52) are disposed. The contact terminal plates are each bent in L shape as a whole, forming a horizontal portion (30, 53) and a vertical portion (31, 54). The front end of each horizontal portion is formed with a hook (32, 55), which engages an engaging groove (34) formed in the case while a bulge (33) formed on the vertical portion (31) elastically contacts a vertically extending wall (36) formed on the vertical portion, whereby the contact terminal plate is firmly positioned.

20 Claims, 11 Drawing Figures

BATTERY PACK

BACKGROUND OF THE INVENTION

1. Field of the Invention

This invention relates to a battery pack and more particularly it relates to improvements in a construction for attaching contact terminal means acting as charging or discharging terminals in a battery pack housing a plurality of interconnected unitary cells.

2. Description of the Prior Art

Battery packs to which the invention is directed are used as power source devices for such portable units as video cameras, televisions, radios, tape recorders, and toys. Battery packs usually contain a plurality of interconnected unitary cells for source voltages specified for such portable units. To facilitate the handling of such a plurality of unitary cells, these unitary cells are integrally housed in an outer case, which has attached thereto terminals for electrical connection to such discharging devices as the aforesaid portable units. In most cases, the battery device is so designed that when it is simply inserted into the battery receiving section provided in the discharging device, desired electrical connection is established between it and the discharging device and the positioning of the battery pack itself is attained. That is, it is so arranged that when the battery back is positioned in the battery receiving section, the terminals of the battery pack come in contact with the terminals of the connector section of the discharging device.

Further, to enable such battery pack to be used repeatedly, there is a case where the unitary cells housed in the case are secondary cells, such as rechargeable nickel-cadmium cells or lead acid cells. In this case, the combination of the terminals for discharging is made different from that of the terminals for charging in order to avoid making mistakes in electrical connection. Usually, in this case, there are three terminals, of which the first and second are used for discharging and the first and third for charging.

Battery packs which are of interest to this invention are disclosed in U.S. Pat. No. 4,123,598 granted to Hammel, and pending U.S. patent application Ser. No. 317,073 filed under the name of Hashimoto and assigned to the same assignee as in this application. The terminals provided in these prior art battery packs are exposed on the outer surface of the case. The arrangement wherein the terminals are exposed on the outer surface of the case is advantageous in that it facilitates electrical connection to a discharging or charging device, but on the other hand it encounters problems that the terminals are liable to suffer external damage and that shorts are liable to be caused as when some metal object accidentally comes in contact with the terminals.

SUMMARY OF THE INVENTION

Accordingly, the principal object of this invention is to provide a battery pack having terminal means so arranged that it hardly suffers external damage.

Another object of the invention is to provide a battery pack capable of avoiding accidental shorts, wherein, in particular, when it is connected to a discharging or charging device, the terminals are completely hidden from exterior, whereby high safety is ensured.

In brief, this invention is a battery pack which comprises the following. Thus, it has a case defining a chamber therein, and one end surface of the exterior of said case is formed with an end peripheral wall defining a recess. The chamber in said case houses a battery assembly comprising a plurality of interconnected unitary cells. The battery assembly has two terminals of opposite polarities. The terminals of said battery assembly have electrically connected thereto contact terminal means mounted on the inner surface of the end peripheral wall of said case. Since the contact terminal means is disposed within the recess of the case in this manner, the problem of external damage is avoided and safety from shorts is enhanced. The connector section of a charging or discharging device is inserted through the opening of said recess, the contact terminal means of the battery pack and the contact terminal means of said connector section are contacted with each other to attain electrical connection.

In a preferred embodiment of this invention, the contact terminal means comprises contact terminal plates in the form of metal plate, each contact terminal plate having a hook formed by bending one end thereof in U shape. The end surface of said end peripheral wall is formed with engaging grooves for receiving the ends of said hooks to position the contact terminal plates. The open surface of said engaging grooves in the end surface of said end peripheral wall are located in a plane inwardly spaced a distance greater than the thickness of the contact terminal plates apart from the outermost projecting portion of the end surface of the end peripheral wall. This arrangement so positions the contact terminal plates as not to be exposed on the outer surface of the case. Each contact terminal plate is bent in L-shape as a whole to form a horizontal portion and a vertical portion, said horizontal portion extending along the inner surface of said end peripheral wall, said vertical portion extending into said chamber. Further, said case comprises an upper case portion and a lower case portion, each of portions having a bottom wall and a lateral wall rising from the peripheral edge of said bottom wall, these walls defining said chamber. The bottom surface of said recess is formed by a portion of the lateral wall of the upper case portion, and the horizontal portions of the contact terminal plates extend through a clearance between said portion of the lateral wall and the bottom wall of the lower case portion, while the vertical portions of the contact terminal plates extend along the surface of said portion of the lateral wall of the upper case portion facing to the chamber. The vertical portions of the contact terminal plates are each formed with at least one bulge projecting toward said portion of the lateral wall of the upper case portion, whereby when the upper case portion approaches the lower case portion, said vertical portion and said portion of said lateral wall are guided away from each other. This guidance has the following significance. The more closely the vertical portions of the contact terminal plates contact said portion of the lateral wall of the upper case, the more the attached state of the contact terminal plates is stabilized. However, in this case, when the upper case portion is brought closer to the lower case portion until they are assembled into the complete case, said portion of the lateral wall of the upper case abuts against the top ends of the vertical portions of the contact terminal plates, thus not only making it difficult for the upper case portion to approach the lower case portion but also causing the danger of damaging the vertical portions of the contact terminal plates or said portion of the lateral wall of the upper case portion. To prevent this, if the dimensions are so determined as to define a clearance between the vertical portions of the contact terminal plates and said portion of the lateral wall of the upper case portion, then a problem would arise that the attached state of the contact terminal plates becomes unstable. Thus, if guide means such as the aforesaid bulges are provided, a sufficient clearance is defined between said portion of the lateral wall of the upper case portion and the vertical portions of the contact terminal plates to make it possible to stabilize the attached state of the contact terminal plates. In addition, said guide means may be provided also by forming said portion of the lateral wall of the upper case portion with ribs sloping to contact the vertical portions of the contact terminal plates.

DESCRIPTION OF THE PREFERRED EMBODIMENTS

An embodiment of this invention will now be described with reference to FIGS. 1 through 8.

Figure 1:
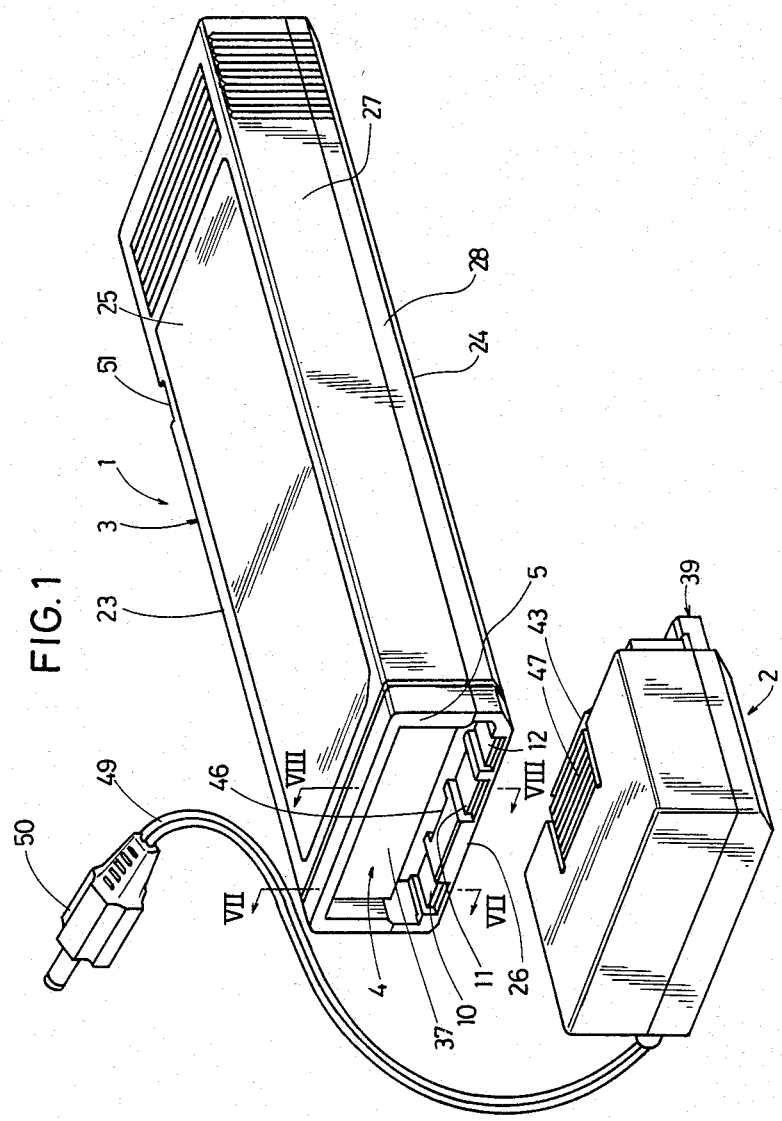
FIG. 1 is a perspective view looking at a battery pack of an embodiment of this invention obliquely from above, the view also showing a connector device.
Figure 2:
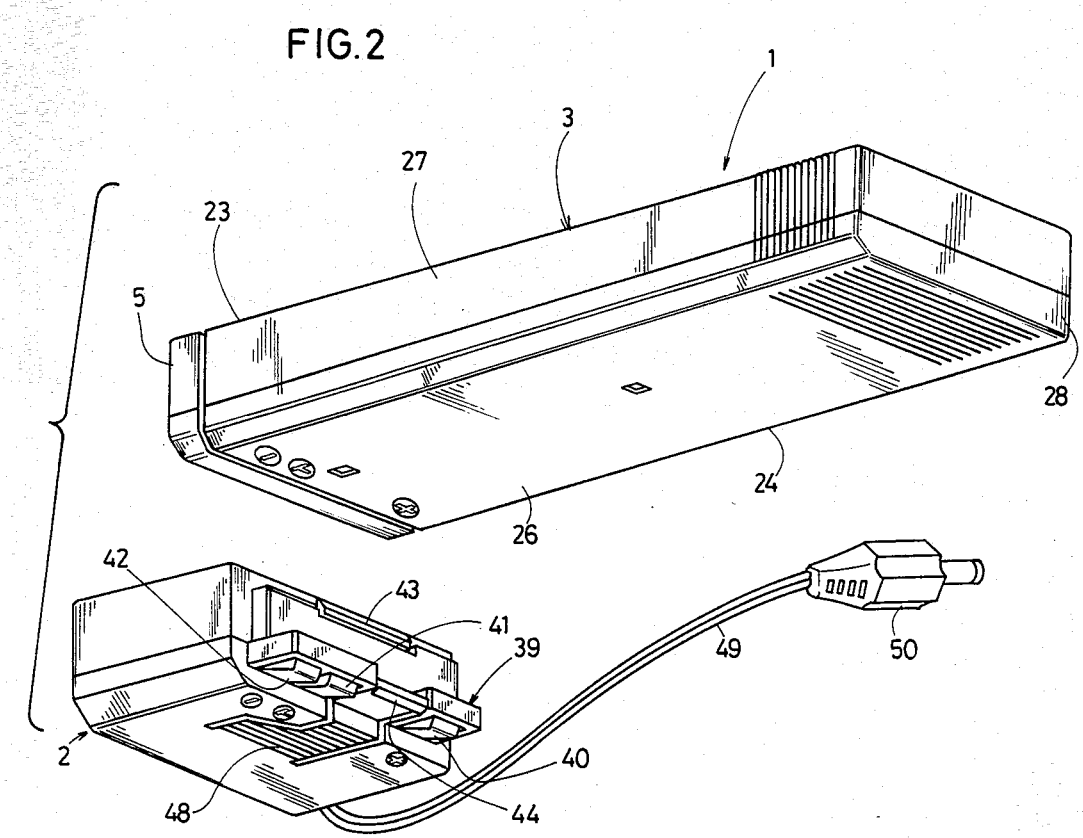
FIG. 2 is a perspective view looking at the battery pack of FIG. 1 obliquely from below, the view also showing the connector device of FIG. 1.
Figure 4:
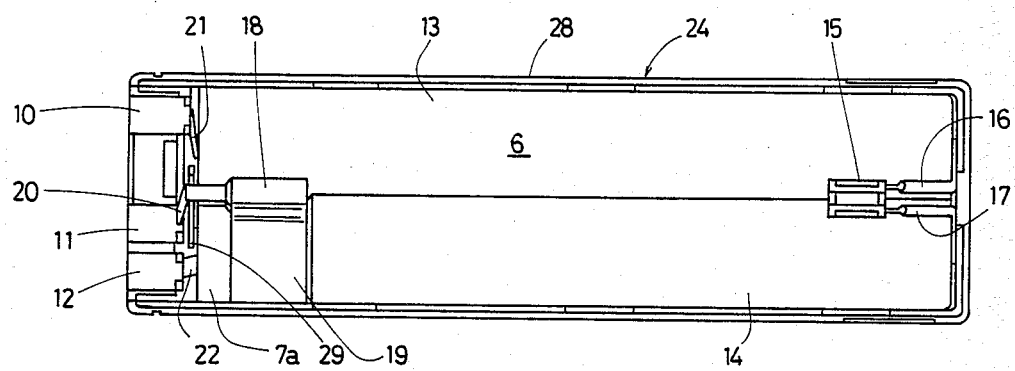
FIG. 4 is a plan view showing the lower case portion of FIG. 3 and components held therein.
Figure 5:
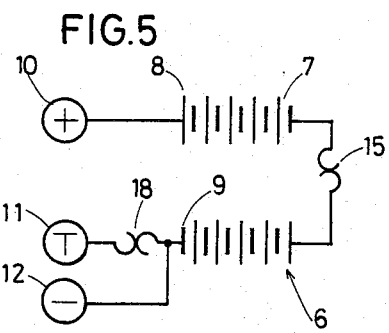
FIG. 5 is an electrical wiring diagram of the circuitry in the battery pack of FIG. 1.

A battery pack 1 shown in FIGS. 1 and 2 will be connected to, e.g., a connector device 2 to effect discharging or charging. The battery pack 1 is provided with a case 3 defining a chamber therein, one end surface of the exterior of said case 3 being formed with a recess 4 defined by an end peripheral wall 5 and having an opening which faces in the direction of said end surface. Housed in the chamber defined inside the case 3 is a battery assembly 6 shown in FIGS. 3 and 4. The battery assembly 6, as shown in FIG. 5, comprises a plurality of unitary cells 7 interconnected in series, so that said battery assembly 6 has, as a whole, two terminals of opposite polarities, a positive pole 8 and a negative pole 9. Mounted within the recess 4 of the case 3 and on the inner surface of the end peripheral wall 5 are three contact terminal plates 10, 11 and 12. Each of the contact terminal plates 10, 11 and 12 is electrically connected directly or indirectly to the positive pole 8 or negative pole 9 of the battery assembly 6.

The battery assembly 6 has the unitary cells 7 divided into two groups, each having five unitary cells. The five unitary cells 7 constituting a first group are inserted in a paper tube 13 and mechanically integrated together. Of the unitary cells 7 constituting a second group, four are inserted in a paper tube 14 and integrated together. The other unitary cell 7a in the second group is exposed. The two groups are arranged in two rows within the case 3 in such a manner that the positive and negative poles 8 and 9 of the battery assembly 6 face in the same direction. In addition, secondary cells such as nickel-cadmium cells are used as the unitary cells 7.

The first and second groups of unitary cells 7 are connected to each other through a breaker 15. The breaker 15 functions to cut off the current flowing therethrough when this current exceeds a predetermined value. Metal lead plates 16 and 17 in the form of strips are used for establishing connection between the breaker 15 and the unitary cells 7.

A thermostat 18 is attached to the jacket of the aforesaid exposed unitary cell 7a by means of an aluminum tape 19. The thermostat 18 is electrically connected to the negative pole of the unitary cell 7a by having its one terminal contacted with the jacket of the unitary cell 7a, the other terminal of the thermostat 18 being connected to the contact terminal plate 11 by a metal lead plate 20 in the form of a strip. The thermostat 18 serves to detect the temperature of the unitary cells 7a which is representative of the unitary cells 7, and will be cut off by the heat produced in the final period of charging.

The aforesaid breaker 15 and thermostat 18 are disposed in a clearance defined between the two rows of unitary cells 7 forming the battery assembly 6, thus saving the occupied space.

The positive pole 8 of the battery assembly 6 is connected to the contact terminal plate 10 through a metal lead plate 21 in the form of a strip. The negative pole 9 of the battery assembly 6 is connected to the contact terminal plate 12 through a metal lead plate 22. In addition, spot welding is used for joining the aforesaid metal lead plates 16, 17, 20, 21 and 22 to their associated contact terminal plates and unitary cell.

When the electrical connection as described above has been made, wiring as shown in FIG. 5 is realized in the battery pack 1. In this battery pack 1, the contact terminal plate 10 and 12 are used for discharging and the contact terminal plates 10 and 11 for charging.

Figure 3:
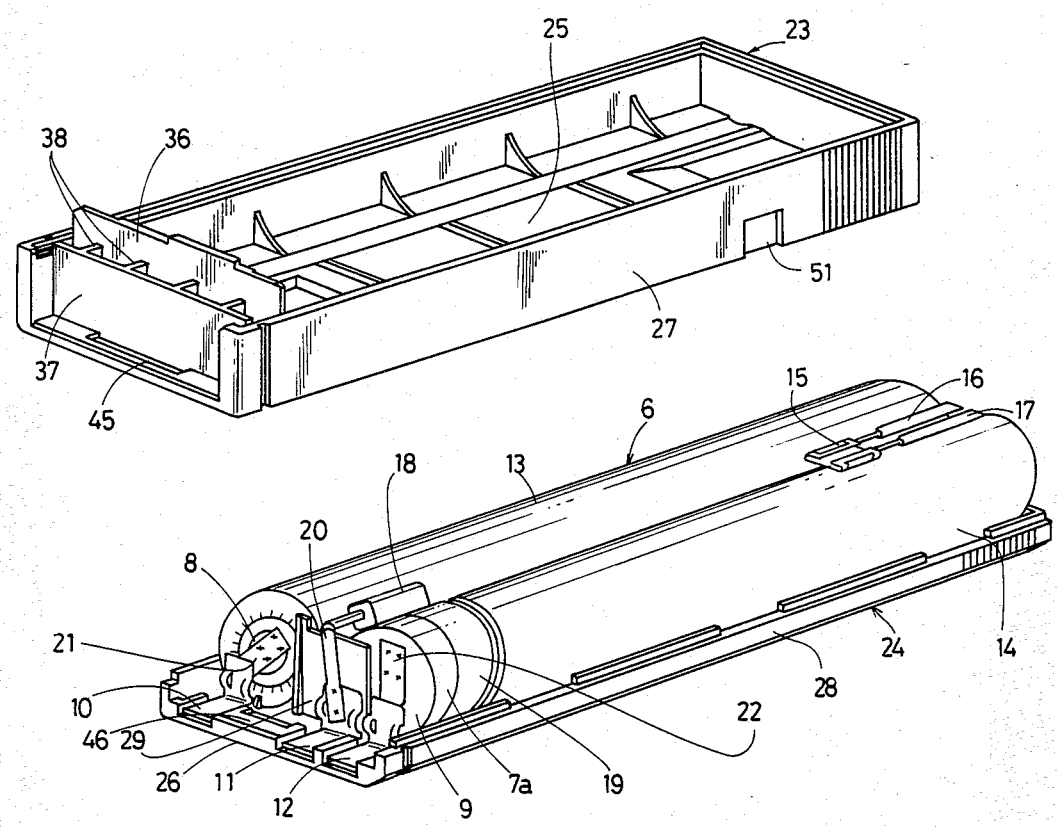
FIG. 3 is a perspective view showing the internal construction of the battery pack of FIG. 1, wherein an upper case portion constituting a case is shown separated from a lower case portion.

As best shown in FIG. 3, the case 3 is composed of an upper case portion 23 and a lower case portion 24. These portions are made preferably of nonflammable shock-resistant synthetic resin. As shown in FIGS. 3 and 4, after the battery assembly 6 and contact terminal plate 10, 11 and 12 have been mounted in position in the lower case portion 24, the upper case portion 23 is put on the lower case portion 24, and these portions are welded together as by ultrasonic welding. In this embodiment, the upper and lower case portions 23 and 24 are both in the form of trays, but the lower case portion 24 is shallower than the upper case portion 23. This makes it easier to arrange the components on the lower case portion 24.

The upper and lower case portions 23 and 24 have bottom walls 25 and 26 and lateral walls 27 and 28 rising from said bottom walls 25 and 26, respectively. These bottom walls 25 and 26 and lateral walls 27 and 28 define the chamber for housing the battery assembly 6. Therefore, the inner surface of the upper case portion 23, as shown in FIG. 3, is formed with suitable ribs and recesses for positioning the battery assembly 6 and the related breaker 15 and thermostat 18. Similar ribs and recesses (not shown) are formed on the inner surface of the lower case portion 24. In the lower case portion 24, a wall 29 rising from the bottom wall 26, which is among the illustrated elements, serves to position the battery assembly 6.

Figure 6:
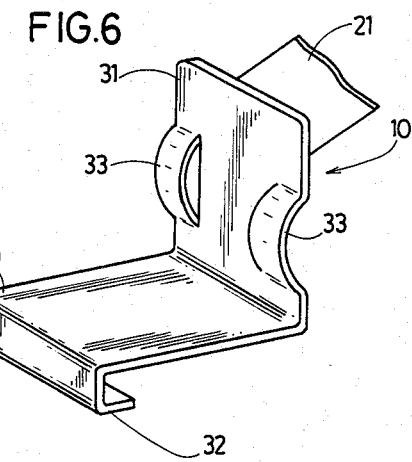
FIG. 6 is an enlarged perspective view of a contact terminal plate used in the battery pack of FIG. 1, with a metal lead plate attached thereto.
Figure 7:
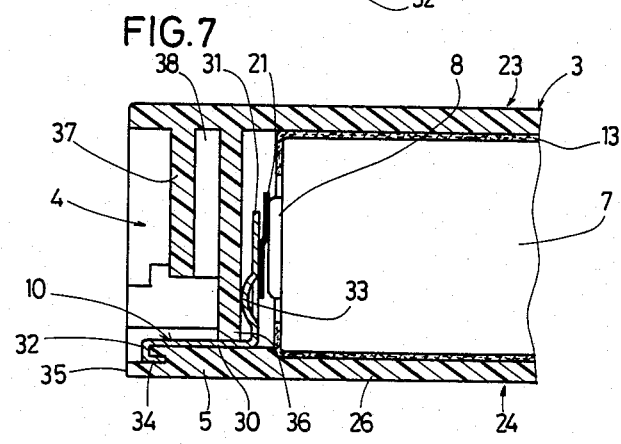
FIG. 7 is an enlarged sectional view taken along the line VII—VII of FIG. 1.

In FIG. 6, the contact terminal plate 10 is shown, and FIG. 7 shows a sectional view taken along the line VII—VII of FIG. 1, corresponding to the position where said contact terminal plate 10 is provided. The contact terminal plate 10 is in the form of a metal plate bent in L shape, forming a horizontal portion 30 and a vertical portion 31. The end of the horizontal portion 30 is formed with a hook 32 outwardly bent in U shape. Further, the vertical portion 31 is formed with two bulges 33 extending along opposite edges thereof.

On the other hand, the end surface of the end peripheral wall 5 of the case 3 is formed with an engaging groove 34 for receiving the end of the hook 32. The open surface of the engaging groove 34 in the end surface of the end peripheral wall 5 is located in a plane inwardly spaced a distance greater than the thickness of the contact terminal plate 10 apart from the outermost projecting portion 35 of the end surface of the end peripheral wall.

With the hook 32 received in the engaging groove 34, the contact terminal plate 10 is positioned relative to the lower case portion 24. With the positioning thus made, the horizontal portion 30 of the contact terminal plate 10 extends along the end peripheral wall 5, i.e., the bottom wall 26 of the lower case portion 24, while the vertical portion 31 extends within the chamber in which the battery assembly 6 is housed.

The bottom surface of the recess 4 formed in the case 3 is defined by a keep wall 36 forming a portion of the lateral wall 27 of the upper case portion 23. The end of the keep wall 36 cooperates with the bottom wall 26 of the lower case portion 24 to hold the horizontal portion 30 of the contact terminal plate 10 therebetween. The vertical portion 31 of the contact terminal plate 10, at its bulges 33, elastically contacts the keep wall 36.

As previously described, when the upper case portion 23 is put on the lower case portion 24, the keep wall 36 and the vertical portion 31 of the contact terminal plate 10 are guided by the bulges 33 so that the vertical portion 31 is moved away from the keep wall 36, and the resulting force acts in a direction to urge the hook 32 further into the engaging groove 34, thus making more stable the attached state of the contact terminal plate 10. Further, the presence of the bulges 33 enables the vertical portion 31 of the contact terminal plate 10 and the keep wall 36 to be positioned with a sufficient clearance therebetween to prevent the front ends of the vertical portion 31 and keep wall 36 from colliding with each other when the upper case portion 23 approaches the lower case portion 24.

In the illustrated contact terminal plate 10, two bulges 33 have been formed along opposite edges of the vertical portion 31. This arrangement stabilizes the state of contact between the vertical portion 31 and the keep wall 36. If, however, such merit is not desired, only a single bulge may be provided in the middle of the width of the vertical portion 31. Further, the illustrated bulges 33 are arcuate, but their shape is optional; for example, the bulge may be triangular or may have their lower ends severed and raised.

In addition, the other two contact terminal plate 11 and 12 are the same as in the contact terminal plate 10 in shape and in attached state. With attention called particularly to the contact terminal plate 11, as shown in FIG. 3, the aforesaid wall 29 also serves to insulate the contact terminal plate 11 from the negative pole 9 of the battery assembly 6.

As shown in FIGS. 3, 4 and 7, in order to make the aforesaid circuitry shown in FIG. 5, the positive and negative poles 8 and 9 of the battery assembly 6 are repectively positioned to be opposed to the vertical portions of the associated contact terminal plates 10, 11 and 12 and connected thereto by the metal lead plates 20, 21 and 22. This arrangement enables efficient and simple wiring.

As shown in FIGS. 1, 3 and 7, the upper case portion 23 is formed with a reinforcing wall 37 spaced a predetermined distance apart from the keep plate 36 and positioned inside the recess 4. The reinforcing wall 37 is joined to the keep plate 36 by ribs 38. With the case 3 in the assembled state, the reinforcing wall 37 cooperates with the vertical portions of the contact terminal plates 10, 11 and 12 on the bottom wall 26 of the lower case portion 24 to define a predetermined clearance therebetween. The reinforcing wall 37 and the ribs 38 serve to prevent the heat, which is produced by the contact terminal plates 10, 11 and 12 becoming heated by discharge currents flowing therethrough, from being transmitted to the keep wall 36 to thermally deform the same. The clearance between the keep plate 36 and the reinforcing wall 37 joined together by the ribs 38 advantageously allows flow of air for dissipation of heat.

Figure 8:
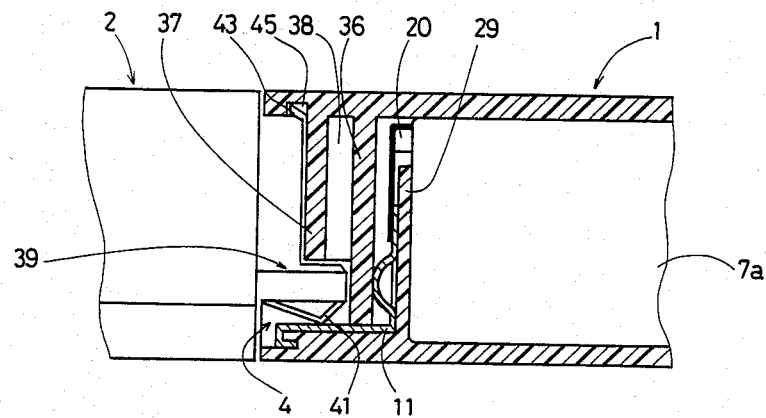
FIG. 8 is an enlarged sectional view taken along the line VIII—VIII of FIG. 1, with the connector device combined with the battery pack.

FIG. 8 shows the battery pack 1 and connector device 2 connected together, the battery pack 1 being shown in a sectional view taken along the line VIII—VIII of FIG. 1. The connector device 2 is provided with a connector portion 39 projecting from the front surface thereof and the lower surface of said connector portion 39 is provided with three contact terminal plates 40, 41 and 42 which are resilient. These terminal plates 40, 41 and 42, when connected, respectively, contact the contact terminal plates 10, 11 and 12 associated with the battery pack 1, to establish electrical connection. The connector device 2 is provided with engaging pawls 43 and 44 which are resiliently displaceable, so that when it is connected to the battery pack 1, these engaging pawls 43 and 44 respectively engage engaging recesses 45 and 46 formed in the case 3 of the battery pack 1, thereby maintaining the connected state. When it is desired to cancel the connected state, this is attained by pushing in upper and lower knurled portions 47 and 48 to move them toward each other, whereupon the engaging pawls 43 and 44 are disconnected from the engaging recesses 45 and 46, respectively, allowing the connector device 2 to be pulled out of the battery pack 1.

A cable 49 extends from the connector device 2 and has a plug 50 attached thereto. When the plug 50 is inserted in the socket of such a discharging device as a video camera (not shown), the intermediate contact terminal plate 41 becomes a dummy. On the other hand, when the plug 50 is inserted in the socket of a charging device (not shown), the contact terminal plate 42 positioned at one end becomes a dummy.

There is an instance where electrical connection is made between the battery pack 1 and a video camera, for example, without using such connector device 2. In this case, a battery receiving section is formed in such a discharging device as a video camera, so that desired electrical connection is made when the battery pack 1 is inserted in said battery receiving section. The innermost region of such a discharging device is formed with a connector portion similar in shape to the connector portion 39 of the illustrated connector device 2. In addition, as shown in FIGS. 1 and 3, a recess 51 formed in the lateral wall 27 of the upper case portion 23 serves to position the battery pack 1 when the latter is inserted in the battery receiving section of such discharging device. That is, the battery receiving section is provided with a suitable fitting element which elastically fits in the recess 51.

As is clear from the connected state shown in FIG. 8, the reinforcing wall 37 formed in the battery pack 1 prevents the connector portion 39 from being inserted in the recess 4 by mistake.

Figure 9:
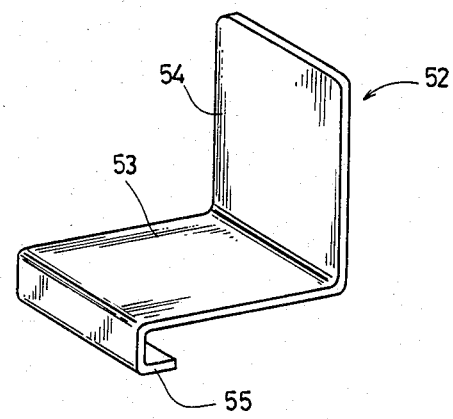
FIG. 9 is an enlarged perspective view of a contact terminal plate used in another embodiment of this invention.
Figure 10:
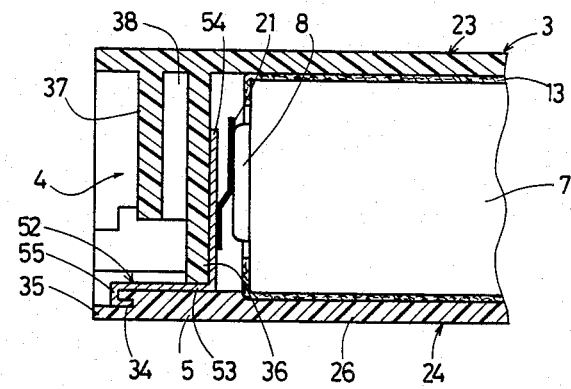
FIG. 10 is a sectional view corresponding to FIG. 7 wherein the terminal plate of FIG. 9 is used.

FIGS. 9 and 10 show another embodiment of the invention. FIG. 9 is a perspective view of a contact terminal plate 52 used in this embodiment, and FIG. 10 shows a portion corresponding to the portion shown in FIG. 7, using the contact terminal plate 52 of FIG. 9. Thus, in FIG. 10, the parts corresponding to those shown in FIG. 7 are given like reference numerals to omit repetitive explanations.

In the same manner as the contact terminal plate 10 shown in FIG. 6, the contact terminal plate 52 is formed with a horizontal portion 53 and a vertical portion 54; the horizontal portion 53 has a hook 55 formed at its end, but the vertical portion 54 has no bulge whatsoever. Therefore, as shown in FIG. 10, when built into the case 3, the vertical portion 54 itself contacts the keep wall 36 to effect the positioning of the contact terminal plate 52. Any one or all of the contact terminal plates 10, 11 and 12 in the preceding embodiment may be replaced by such contact terminal plates 52. The contact terminal plate 52 is less expensive than the aforesaid contact terminal plates 10, 11 and 12.

Figure 11:
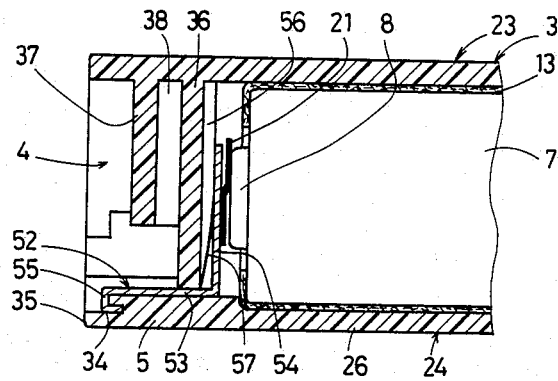
FIG. 11 shows a further embodiment of this invention, the view corresponding to FIG. 7.

FIG. 11 shows a further embodiment of this invention. FIG. 11 also shows a sectional view corresponding to FIG. 7, and the parts corresponding to those shown in FIG. 7 are given like reference numerals to avoid repetitive explanations.

In FIG. 11, contact terminal plates 52 having the same shape as that shown in FIG. 9 are used. The feature of this embodiment is that the keep wall 36 is formed with a rib 56 which has a slope portion 57 added thereto. The rib 56 serves the function of the aforesaid bulge 33. Thus, when the upper case portion 23 approaches the lower case portion 24 in the course of assembling the case 2, the rib 56 guides the vertical portion 54 and the keep wall 36 so that they move away from each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A battery pack comprising:
   a case defining a chamber therein and having an end peripheral wall defining a recess having an opening at one end thereof on the exterior,
   a battery assembly composed of a plurality of interconnected unitary cells and housed in the chamber of said case, said battery assembly having two terminals of opposite polarities, and
   contact terminal means electrically connected to the terminals of said battery assembly and mounted on the inner surface of said end peripheral wall within the recess of the case.

2. A battery pack as set forth in claim 1, wherein said contact terminal means comprise contact terminal plates.

3. A battery pack as set forth in claim 2, wherein said contact terminal plates have a hook formed by bending one of their respective ends in U shape, while the end surface of said end peripheral wall is formed with engaging grooves for receiving the end of said hook to position said contact terminal plates.

4. A battery pack as set forth in claim 3, wherein the open surfaces of said engaging grooves in the end surface of said end peripheral wall lie in a plane inwardly spaced a distance greater than the thickness of the contact terminal plates apart from the outermost portion of the end surface of said end peripheral wall.

5. A battery pack as set forth in claim 3, wherein said contact terminal plates are bent in an L shape as a whole to form a horizontal portion and a vertical portion so that said hook formed at one of their respective ends is positioned outward, said horizontal portions of said contact terminal plates extend along the inner surface of said end peripheral wall and said vertical portions of said contact terminal plates extend into said chamber.

6. A battery pack as set forth in claim 5, wherein said case 3 is composed of an upper case portion and a lower case portion, these portions being joined together.

7. A battery pack as set forth in claim 6, wherein said upper and lower case portions have a bottom wall and a lateral wall rising from said bottom wall, these walls defining said chamber.

8. A battery pack as set forth in claim 7, wherein the bottom surface of said recess is defined by a portion of the lateral wall of said upper case portion, said portion of said lateral wall cooperating with the bottom wall of said lower case portion to define a clearance therebetween.

9. A battery pack as set forth in claim 8, wherein said horizontal portions of said contact terminal plates extend along the bottom wall of said lower case portion and through said clearance between said portion of the lateral wall of said upper case portion forming the bottom surface of said recess and the bottom wall of said lower case portion, while said vertical portions of said contact terminal plates extend along the surface of said portion of the lateral wall of said upper case portion facing to said chamber.

10. A battery pack as set forth in claim 9, wherein said vertical portions of said contact terminal plates at least partly contact said portion of the lateral wall of said upper case portion.

11. A battery pack as set forth in claim 10, wherein the area of contact between the vertical portions of said contact terminal plates and said portion of the lateral wall of said upper case portion is provided with guide means for guiding said vertical portions and said portion of said lateral wall so that they move away from each other when said upper case portion approaches said lower case portion.

12. A battery pack as set forth in claim 11, wherein said vertical portions of said contact terminal plates are each formed with at least one bulge projecting toward said portion of the lateral wall of said upper case portion, said bulge forming said guide means.

13. A battery pack as set forth in claim 12, wherein two such bulges are formed along the opposite edges of said vertical portions of said contact terminal plates.

14. A battery pack as set forth in claim 11 wherein said portion of the lateral wall of said upper case is formed with a rib having a slope portion contacting said vertical portion of said contact terminal plate, said rib forming said guide means.

15. A battery pack as set forth in claimed 9, wherein said battery assembly is oriented in said chamber in such a manner that the terminals of said battery assembly are opposed to said vertical portions of said contact terminal plates.

16. A battery pack as set forth in claim 9, wherein said upper case portion has a reinforcing wall spaced a predetermined distance apart from said portion of said lateral wall and positioned in said recess, said reinforcing wall being connected to said portion of said lateral wall by ribs and defining a predetermined clearance between it and said horizontal portions of said contact terminal plates on the bottom wall of said lower case portion.

17. A battery pack as set forth in claim 1, wherein said contact terminal means are electrically connected to the terminals of said battery assembly by using strip-like metal lead plates welded to said contact terminal means and to the terminals of said battery assembly.

18. A battery pack as set forth in claim 1, wherein said recess serves to receive the connector portion of a charging or discharging device, said connector portion being provided with second contact terminal means adapted to contact said contact terminal means.

19. A battery pack as set forth in claim 18, wherein said end peripheral wall defining said recess has engaging means for maintaining the inserted state of the connector portion of a charging or discharging device.

20. A battery pack as set forth in claim 1, wherein said unitary cells are secondary cells.

* * * * *